United States Patent [19]

Burzin et al.

[11] 4,207,410
[45] * Jun. 10, 1980

[54] METHOD FOR THE PREPARATION AND USE OF POLYETHER ESTER AMIDES WITH UNITS OF THE STARTING COMPONENTS RANDOMLY DISTRIBUTED IN THE POLYMER CHAIN

[75] Inventors: Klaus Burzin; Salih Mumcu; Rainer Feldmann; Hans Jadamus; Roland Feinauer, all of Marl, Fed. Rep. of Germany

[73] Assignee: Chemische Werke Hüls AG, Marl, Fed. Rep. of Germany

[*] Notice: The portion of the term of this patent subsequent to Jul. 18, 1995, has been disclaimed.

[21] Appl. No.: 888,649

[22] Filed: Mar. 21, 1978

[30] Foreign Application Priority Data

Mar. 24, 1977 [DE] Fed. Rep. of Germany ....... 2712987

[51] Int. Cl.$^2$ ............................................. C08G 63/42
[52] U.S. Cl. .................................... 528/288; 528/323; 528/326
[58] Field of Search ............... 528/288, 323, 326, 328; 260/857 PE, 857 PG

[56] References Cited

U.S. PATENT DOCUMENTS

| | | | |
|---|---|---|---|
| 3,655,821 | 4/1972 | Lofquist et al. | 260/857 PE |
| 3,839,245 | 10/1974 | Schlossman et al. | 260/857 PE |
| 3,944,629 | 3/1976 | Hedrick et al. | 260/857 PE |
| 3,993,709 | 11/1976 | Hedrick et al. | 260/857 PE |
| 4,101,524 | 7/1978 | Burzin et al. | 528/288 |

FOREIGN PATENT DOCUMENTS 1473972 5/1977 United Kingdom .

*Primary Examiner*—Walter C. Danison
*Attorney, Agent, or Firm*—Gilbert L. Wells

[57] ABSTRACT

Method for preparing and using thermoplastic polyether ester amides with units of the starting components randomly distributed in the polymer chain. A mixture of:

I. one or more polyamide forming compounds from the group of the omega-aminocarboxylic acids and/or lactams having at least 10 carbon atoms;

II. an alpha, omega-dihydroxy-(polytetrahydrofuran) having an average degree of polymerization of between about 2 and 42 or a molecular weight of between 160 and 3,000; and III. at least one organic dicarboxylic acid is heated in a weight ratio of I to (II+III) of between 30:7 and 98:2. In (II+III) the hydroxy and carboxy groups are present in equivalent amounts. The heating takes place in the presence of 2-30% by weight of water, based on the polyamide-forming compounds of component I, under the internal pressure attained in a closed container at temperatures of between 230° and 300° C. Water is removed as steam and after removal of the water, the product is further treated at 250°-280° C. with the exclusion of oxygen under normal pressure or under reduced pressure.

9 Claims, No Drawings

METHOD FOR THE PREPARATION AND USE OF POLYETHER ESTER AMIDES WITH UNITS OF THE STARTING COMPONENTS RANDOMLY DISTRIBUTED IN THE POLYMER CHAIN

CROSS REFERENCES TO RELATED APPLICATIONS

Applicants claim priority under 35 USC 119 for application No. P 27 12 987.9, filed Mar. 24, 1977 in the Patent Office of the Federal Republic of Germany.

The disclosure of copending application Ser. No. 717,358 of Klaus Burzin et al filed Aug. 24, 1976, now U.S. Pat. No. 4,101,524 is incorporated herein. The patent of Klaus Burzin et al discloses the state of the art of producing colorless polyester amides from monomer starting materials using the steps of:

(a) condensing the starting materials in a first condensing stage in the presence of 3 to 20 percent added water under a pressure of 14 to 25 bar and at a temperature of 220°–300° C.;

(b) removing the water from the first condensing stage; and (c) completely condensing the starting materials in a second condensing stage at a reduced pressure of 0.91 to 100 mbar and at a temperature of 230°–300° C.

BACKGROUND OF THE INVENTION

The field is the invention of Polyether Ester Amides.

The state of the art of preparing polyester amides may be ascertained by reference to British Pat. No. 1,473,972 and U.S. Pat. Nos. 3,944,629 and 3,993,709, the disclosures of which are incorporated herein.

It is known to the prior art that molding compositions of polyamides, particularly those of polylauryllactam and/or polyundecanoic acid amide are particularly well suited for the production of dimensionally stable molded articles according to the extrusion and/or injection-molding methods.

However, it is furthermore known that the flexibility of such molded components leaves something to be desired in certain cases. Conventional plasticizers have been used in such instances as additives, to remedy the lack of flexibility. However, plasticizer-containing polyamides have the disadvantage that they are substantially more brittle at low temperatures than the corresponding, plasticizer-free homopolyamides. Finally, it is known that plasticizers bleed out of the molded components or can be dissolved therefrom.

SUMMARY OF THE INVENTION

Having in mind the limitations of the prior art, it is an object of the present invention to manufacture modified polyamides suitable for the production of molded components possessing an increased flexibility and exhibiting, especially under cold conditions, an increased impact strength. In particular, modified polyamides are desirable which are prepared on the basis of lauryllactam and/or omega-aminoundecanoic acid.

The object of the present invention is attained by producing thermoplastic polyether ester amides having units of the starting components which are randomly distributed in the polymer chain. The polyether ester amides obtained are considered to be internally plasticized products.

The method for producing the thermoplastic polyether ester amides with units of the starting components randomly distributed in the polymer chain, comprises heating a mixture of:

I. one or more polyamide forming compounds from the group of the omega-aminocarboxylic acids and/or lactams with at least 10 carbon atoms;

II. an alpha, omega-dihydroxy-(polytetrahydrofuran) having an average degree of polymerization of between about 2 and 42 or a molecular weight of between about 160 and 3,000; and III. at least one organic dicarboxylic acid in a weight ratio of I to (II+III) of between 30:70 and 98:2. The II and III components have hydroxy and carboxy groups present in equivalent amounts. The heating is carried out in the presence of about 2–30% by weight of water, based on the polyamide forming compounds of component I, under the internal pressure attained in a closed container at temperatures of between 230° C. and 300° C. Water is removed as steam and after removal of the water the product is further treated at 250°–280° C. with the exclusion of oxygen under normal pressure or under reduced pressure.

A process for the production of polyether ester amides is known from British Pat. No. 1,473,972, but the products are so-called block or segment copolymers. Such block copolymers normally exhibit two second order transition points or melting temperatures, respectively, and thus cannot be compared with respect to their physical property spectrum with randomly constructed polyether ester amides according to the present invention.

U.S. Pat. Nos. 3,944,629 and 3,993,709 describe a process for the preparation of terpolymers from lactam, polyesters, and polyethers, operating according to the method of activated, anionic polymerization. Such products do not have a stable melting point.

U.S. Pat. No. 4,101,524 discloses a method for the preparation of colorless polyester amides. The molding compositions obtained thereby are suitable for processing in accordance with the extrusion or injection-molding procedures. However, the cold impact strength of the molded components produced thereby still leaves much to be desired.

Particularly in a further development of the process of U.S. Pat. No. 4,101,524 it is possible to obtain the desired products by the use of oligomeric alpha, omega-dihydroxy-(polytetrahydrofuran).

DESCRIPTION OF THE PREFERRED EMBODIMENTS

The polyamide-forming components of component I utilized are omega-aminocarboxylic acids and/or lactams of at least 10 carbon atoms, especially lauryllactam and/or omega-aminododecanoic acid or omega-aminoundecanoic acid.

The diol of component II is alpha, omega-dihydroxy-(polytetra-hydrofuran) having an average molecular weight of between about 160 and 3,000, preferably between about 300 and 2,200, especially between about 500 and 1,200, corresponding to an average degree of polymerization of between 2 and 42, preferably between about 4 and 30, especially between about 7 and 17.

Suitable dicarboxylic acids of component III are aliphatic dicarboxylic acids of the general formula HOOC—$(CH_2)_x$—COOH, wherein x can have a value of between 4 and 11. Examples of the general forumula are adipic acid, pimelic acid, suberic acid, azelaic acid, sebacic acid and decanedicarboxylic acid. Furthermore usable are cycloaliphatic and/or aromatic dicarboxylic acids of at least eight carbon atoms, e.g. hexahydro-threphthalic acid, terephthalic acid, isophthalic acid, phthalic acid, or naphthalene-dicarboxylic acids.

Components I, II, and III are used in quantitative ratios wherein the weight ratio of I:(II+III) is between 30:70 and 98:2, preferably between 50:50 and 95:5, especially between 60:40 and 90:10. This corresponds approximately to a molar ratio of between 26.2:73.8 and 99.75:0.25, preferably between 54.2:45.8 and 99.1:0.9, especially 71.2:28.3 and 97.2:2.8. In the mixture of components (II+III), the hydroxy and carboxy groups are present in equivalent amounts.

It is also optionally possible to use the reaction product from components II and III, the so-called oligo ether ester. This oligo ether ester is, in such a case, prepared by interesterification of the dicarboxylic acid methyl esters with alpha, omega-dihydroxy-(polytetrahydrofuran) in a separate reactor in the conventional way at 180°-220° C. under an inert gas atmosphere in the presence of a conventional interesterification catalyst, such as, for example, zinc acetate or calcium acetate, or tetraalkyl titanates.

The reaction of the mixture from components I, II, and III or from I and the reaction mixture from II and III takes place in an autoclave in the presence of about 2-30% by weight, preferably 3-20% by weight of water, based on the components of group I. The temperature in the autoclave is about 230°-300°, preferably 250°-300° C. The internal pressure reaches values up to 25 bar. This pressure is dependent on the adjusted temperature, the amount of water utilized, and the volume of the gas space compared to the volume of the mixture of water and starting components. The process is advantageously conducted under pressures of about 14-25 bar, especially 16-20 bar. The reaction time ranges generally between about 4 and 12 hours, preferably between 6 and 10 hours. Of course, the reaction is conducted with the exclusion of oxygen, by purging the autoclave with nitrogen. After the preliminary condensation is terminated, the water is first of all removed practically entirely from the reaction batch by expanding the gas contained in the reaction vessel under heating. The preliminary condensate is thereafter completely condensed in a second condensation step under normal pressure at about 230°-300° C. by passing nitrogen over the charge. It is also possible to operate under a reduced pressure between about 100 and 0.01 mbar, preferably between 0.1 and 30 mbar.

The desired solution viscosities of the completely condensed polyether ester amides range between about 1.3 and 2.4, preferably between 1.5 and 2.2, measured according to German Industrial Standard DIN 53 727 in m-cresol at 25° C.

In the preparation of the polyether ester amides, conventional catalysts are utilized, if desired, in the usual quantities, such as, for example, phosphoric acid, zinc acetate, calcium acetate, triethylamine, or tetraalkyl titanates. Advantageously, phosphoric acid is used in this case as the catalyst in amounts of between 0.05 and 0.5% by weight, based on the sum total of components I+II+III.

The polyether ester amides can also contain additives which are introduced prior to, during, or after the polycondensation. Examples of such additives are conventional pigments, flatting agents, auxiliary processing agents, fillers, as well as customary thermal and UV stabilizers. It is furthermore possible to add to the polyether ester amides plasticizing agents.

The polyether ester amides of this invention are suitable for the preparation of molded articles, such as pipes, films, and sheets. They can be processed in accordance with the injection-molding or extrusion methods.

The present invention is explained hereinbelow with reference to specific examples in a more detailed description. The relative solution viscosities were measured in m-cresol under the conditions described in German Industrial Standard DIN 53 727. The softening temperatures were determined according to the differential scanning calorimetry (DSC) method. The torsional oscillation measurements were conducted on pressed plates manufactured at a temperature of 210° C. and under a pressure of 40 bar. The measuring frequency was 1 Hz (hertz=cycle per second). In accordance with this method, the torsional modulus was determined in dependence on the temperature, as well as the glass transition temperature.

For tests to determine the cold impact strength, the granulated material was processed in a single-screw extruder with a three-zone screw at a bulk temperature of about 220° C. into pipes having an external diameter of 6.35 mm and a wall thickness of 1 mm. The pipes were first tempered for 24 hours at 110° C. in a heated furnace, and then subjected at −40° C. to a cold impact strength test according to SAE J 844c. Furthermore, notched impact strength values were measured according to German Industrial Standard DIN 53 453 on rods at +20° and −40° C.

COMPARATIVE EXAMPLE 100 parts by weight of polyamide 12 having a relative viscosity of 2.15; 15 parts by weight of benzenesulfonic acid N-n-butylamide as the plasticizer; and 1 part by weight of N,N'-hexamethylene-bis(3,5-di-tert.-butyl-4-hydroxyhydrocinnamic acid amide) as the stabilizer were homogenized in a twin-screw extruder, then granulated, and dried to a residual moisture content of less than 0.05%.

| Softening temperature | | 170° C. |
|---|---|---|
| ETA rel | | 1.95 |
| Glass transition temperature | | −21° C. |
| Shear modulus [N . mm$^{-2}$] | −40° C. | 870 |
| | +20° C. | 180 |
| Cold impact strength test according to SAE J 844c at −40° C. | | 7/10 Rupture |

EXAMPLE 1

100 parts by weight of lauryllactam, 26.29 parts by weight of alpha, omega-dihydroxy-(polytetrahydrofuran) having an average molecular mass of 860; 7.04 parts by weight of dodecanedioic acid; and 4.5 parts by weight of water were heated for 8 hours in a stirred autoclave to 270° C., thus attaining an internal pressure of about 19 bar. The reaction mixture was subjected to expansion for one hour, and nitrogen was passed over the mixture for 7 hours. In the last 30 minutes, 1.33 parts by weight of N,N'-hexamethylene-bis(3,5-di-tert.-butyl-4-hydroxy-hydrocinnamic acid amide) was stirred into the melt as a stabilizer. The batch was then discharged and granulated. The thus-obtained colorless granules were dried to a residual moisture content of less than 0.05%.

| Softening temperature | | 169° C. |
|---|---|---|
| ETA rel | | 1.95 |
| Glass transition temperature | | about −20° C. |
| Shear modulus [N . mm$^{-2}$] | −40° C. | 470 |
| | +20° C. | 150 |
| Cold impact strength test according to SAE J 844c at −40° C. | | No rupture |

EXAMPLE 2

100 parts by weight of lauryllactam; 28.6 parts by weight of alpha, omega-dihydroxy-(polytetrahydrofuran) having an average molecular mass of 1000; 4.75 parts by weight of terephthalic acid; 0.04 part by weight of triethylamine as the catalyst in 4.5 parts by weight of water were reacted to a polyether ester amide in analogy to Example 1. The granules were dried to a residual moisture content of less than 0.05%.

| Softening temperature | | 165° C. |
|---|---|---|
| ETA rel | | 1.80 |
| Glass transition temperature about | | −15° C. |
| Shear modulus [N . mm$^{-2}$] | −40° C. | 500 |
| | +20° C. | 200 |
| Cold impact strength test according to SAE J 844c at −40° C. | | No rupture |

EXAMPLE 3

100 parts by weight of lauryllactam; 78.88 parts by weight of alpha,omega-dihydroxy-(polytetrahydrofuran) having an average molecular mass of 860; 21.13 parts by weight of dodecanedioic acid; 0.1 part by weight of phosphoric acid as the catalyst in 4.5 parts by weight of water were reacted to a polyether ester amide in accordance with Example 1. However, in this case nitrogen was passed over the reaction mixture for 5 hours, and then the reactor was evacuated for 2 hours at 20 mbar.

| Softening temperature | | 154° C. |
|---|---|---|
| ETA-rel | | 1.54 |
| Glass transition temperature | | −70° C. |
| Shear modulus [N . mm$^{-2}$] | −40° C. | 180 |
| | +20° C. | 40 |
| Notched impact strength according to DIN 53 453 [mJ . mm$^{-2}$] | −40 C. | No rupture |
| | +20° C. | No rupture |

We claim:

1. A method for the production of thermoplastic polyether ester amides having units of the starting components randomly distributed in the polymer chain, comprising:

(A) heating at a temperature of about 230°–300° C. a mixture consisting essentially of:

I. at least one polyamide forming compound selected from the group consisting of omega-aminocarboxylic acids having at least 10 carbon atoms, lactams having at least 10 carbon atoms, or omega-aminocarboxylic acids and lactams having at least 10 carbon atoms;

II. an alpha, omega-dihydroxy-(polytetrahydrofuran) having an average degree of polymerization of between about 2 and 42 or a molecular weight of between 160 and 3,000; and III. at least one organic dicarboxylic acid; in a weight ratio of I to (II+III) of between 30:70 and 98:2, wherein hydroxy and carboxy groups in components II and III are present in equivalent amounts, in the presence of about 2–30% by weight of water, based on the polyamide-forming compounds of group I, under the internal pressure developed in a closed container and condensing a product;

(B) removing the water from the condensing stage (A); and (C) completely condensing the product in a second condensing stage with the exclusion of oxygen under normal pressure or under reduced pressure at about 250°–280° C.

2. The method of claim 1, wherein condensing step (A) is carried out at a pressure of about 14–25 bar.

3. The method of claim 2, wherein condensing step (C) is carried out at a pressure of about 100–0.01 mbar.

4. The method of claim 2, wherein said dicarboxylic acid of III has the general formula HOOC—(CH$_2$)$_x$—COOH wherein X is between 4 and 11.

5. Use of the thermoplastic polyether ester amides of claim 1, for the manufacture of molded components having a high cold impact strength at low temperatures.

6. Thermoplastic polyether ester amides having solution viscosities of about 1.3 to 2.4 as measured in meta-cresol at 25° C. according to German Industrial Standard 53 727 and having units of the starting components randomly distributed in the polymer chain prepared by the method of:

(A) treating at a temperature of about 230°–300° C. a mixture consisting essentially of:

I. at least one polyamide forming compound selected from the group consisting of omega-aminocarboxylic acids having at least 10 carbon atoms, lactams having at least 10 carbon atoms, or omega-aminocarboxylic acids and lactams having at least 10 carbon atoms;

II. an alpha, omega-dihydroxy-(polytetrahydrofuran) having an average degree of polymerization of between about 2 and 42 or a molecular weight of between 160 and 3,000; and III. at least one organic dicarboxylic acid; in a weight ratio of I to (II+III) of between 30:70 and 98:2 wherein hydroxy and carboxy groups in components II and III are present in equivalent amounts, in the presence of about 2–30% by weight of water, based on the polyamide-forming compounds of Group I, under the internal pressure developed in a closed container and condensing a product;

(B) removing the water from the condensing stage (A); and (C) completely condensing the product in a second condensing stage with the exclusion of oxygen under normal pressure or under reduced pressure at about 250°–280° C.

7. The polyether ester amides of claim 6, wherein said dicarboxylic acid of III has the general formula HOOC—(CH$_2$)$_x$—COOH wherein x is between 4 and 11.

8. The polyether ester amides of claim 7, wherein component I is lauryllactam.

9. The polyether ester amides of claim 7, wherein said solution viscosities are 1.5 to 2.2.

* * * * *